R. O. Lowrey.
Mail Bag.
N° 95,817. Patented Oct. 12, 1869.
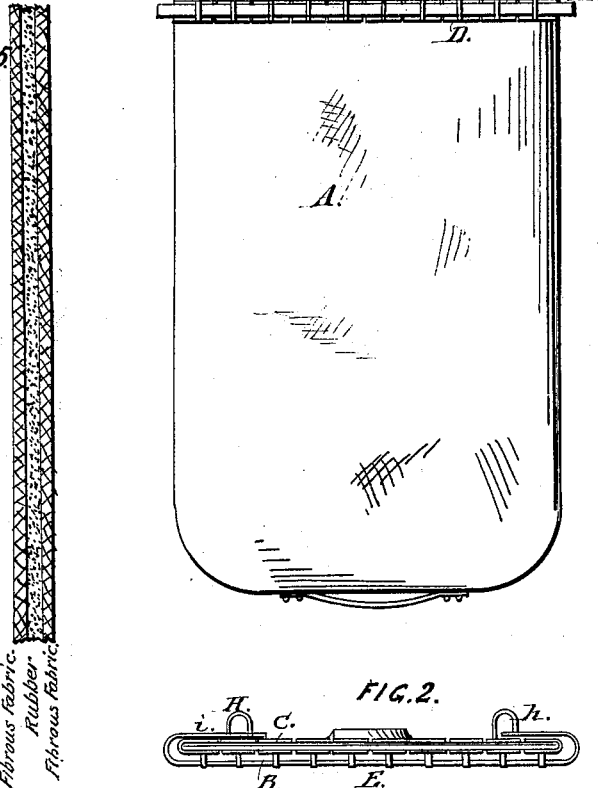
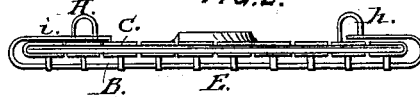
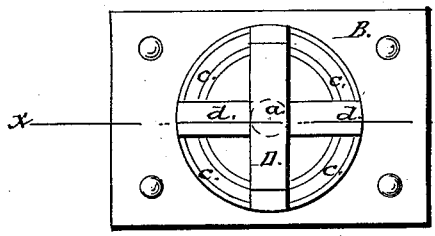
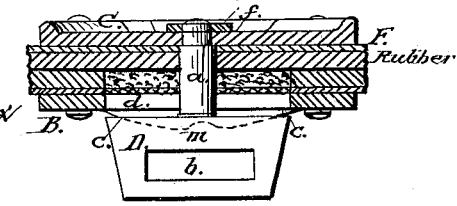
WITNESSES:
L. Hauler.
Phil. T. Dodge.
INVENTOR:
R. O. Lowry
by
Dodge & Munn.
attys.

United States Patent Office.

R. O. LOWREY, OF SALEM, NEW YORK.

Letters Patent No. 95,817, dated October 12, 1869.

IMPROVEMENT IN MAIL-BAGS.

The Schedule referred to in these Letters Patent and making part of the same.

*To all whom it may concern:*

Be it known that I, R. O. LOWREY, of Salem, in the county of Washington, and State of New York, have invented certain new and useful Improvements in Bags for Transportation of Mail-Matter, &c.; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to bags, for mail and other purposes, and consists in so constructing and locking them as to be impervious to water, by the use of water-proof materials for their body; and also by the insertion of rubber packing in their mouths, and fastening or locking them by a series of novel mechanical devices, as hereinafter described.

In the drawings—

Figure 1 is a side view of my bag, locked;

Figure 2 is a top plan view of the same;

Figure 3 is a side-view of one of the series of my locking-devices, detached;

Figure 4 is a horizontal section, on the line x–x of fig. 3; and

Figure 5 is a cross-section of a portion of the body of the bag.

In all cases where bags are liable to be exposed to water, it is desirable to have them completely impervious to that element, for the protection of their contents.

To produce a bag possessing this characteristic, and which may at the same time be easily and conveniently opened and closed, is the object of my invention; and to accomplish this result, I make the body A of the bag out of two thicknesses of any fibrous fabric, suitable for the purpose, interposing between them a layer of rubber, as clearly shown in fig. 5.

The rubber may be in a sheet, independent of the fabric, or a layer or thin sheet of the rubber may be rolled or spread upon the fabric before the parts are united.

The fabric itself may be made water-repellent, if desired, by any of the known processes, and instead of the rubber, any other similar water-proof material may be used.

For some purposes, I substitute for the outer fabric leather, which gives it all the qualities of a leather bag; and for other purposes, when a light bag is required, I make it with a single thickness of fabric or leather, with a rubber coating on the inside.

Having thus constructed the body of the bag A, I surround the interior of its mouth with a strip of rubber-packing, F, as shown in the cross-section of a part detached in fig. 4; and to one side of the mouth, securely attach a series of metallic plates, C, on its outside, as clearly shown in figs. 2 and 4, and on the opposite side of the mouth, and on its outside, another series of metallic plates, B, of the same size as the plates C.

These plates are all made rectangular, as shown in figs. 1 and 2, and are arranged in line about the mouth of the bag, and so that the plates B will be immediately opposite the plates C, as shown in figs. 2 and 4, both for clasping or binding the sides of the mouth closely, and leaving it more flexible than if the parts were hinged.

To the centres of the plates C, I connect, loosely, the neck $a$, of a metallic button, D, by riveting it fast to a small annular disk or washer, $f$, on the outside of the plate C, as shown in fig. 4.

The neck $a$ I provide with a shoulder, $g$, to prevent its passing through the plate, and to form a bearing on its inside, as shown in the same figure.

The head of the button D, I construct with an opening or slot, $b$, and shape, as clearly shown in figs. 3 and 4, so that it may readily enter, and easily pass through a slot, $d$, in the edge of the mouth of the bag, and the plate B opposite, as shown in the same figures.

On the face of the plate B, I make two semicircular inclines, $c$, on the opposite sides of the slot $d$, as shown in fig. 3.

The ends of these inclines are flush with the edges of the slot, and are highest at the point of their curves farthest from the slot, and at this point have a depression, $m$, as shown in fig. 4, so that when the head of the button D is passed through the slot $d$, and turned, it will be forced to ride up along the inclines, until it reaches the depressions $m$, into which it will drop, and remain, as clearly shown in fig. 3; and when this is done, it will be seen that by having the neck $a$ of the requisite length, the sides of the mouth of the bag will be tightly compressed and firmly held together.

To one of the plates C, near each end of the mouth of the bag, I attach staples H, as shown in fig. 2, and to one of these staples connect a locking-strap, E, by means of a metallic eye, $h$, attached to it for that purpose, as shown in the same figure, and to the opposite end of the same strap I attach another metallic eye, $i$, and provide it with a slot, of the requisite size, to pass over the other staple H, as shown in the same figure.

The slot in the staple $i$ is made sufficiently large to pass over the heads of the buttons D for a purpose hereinafter explained.

Having thus constructed my mail-bag, I fasten it by passing the heads of the buttons D through the slots $d$, and then turning them so as to rise on the inclines $c$, using the eye attached to the loose end of the strap E as a lever for that purpose, if necessary.

After the buttons have been all entered and turned in this way, they are kept in place by a small groove or depression, $m$, in the highest part of the inclines, into which they enter. I then lock the bag in the usual manner, by passing the loose end of the strap through an eye, $b$, in the heads of the buttons D, shown in fig. 4, and slipping the eye over the staple H, as shown in fig. 2, when the lock may be attached.

The bag thus constructed and locked will be found to be both water and air tight, even under great pressure, thus furnishing a most excellent bag for the protection of mail or other matter from injury by water, in case of exposure in any way.

Having thus described my invention,

What I claim, is—

1. A bag, having its body constructed of fibrous or textile fabrics and India rubber combined, in the manner substantially as herein described, for the transportation of mail or other matter, as set forth.

2. The metallic plates B and C, when constructed and arranged for operation, substantially as and for the purpose set forth.

3. The combination of the plates B and C, with the button D, when constructed and arranged to operate substantially as and for the purpose set forth.

4. The combination of the bag A and rubber packing F, with the metallic plates B and C, and button D, all constructed and arranged substantially as and for the purpose set forth.

R. O. LOWREY.

Witnesses:
   H. B. MUNN,
   PHIL. T. DODGE.